United States Patent
Zhang et al.

(10) Patent No.: US 9,276,282 B2
(45) Date of Patent: Mar. 1, 2016

(54) AROMATIC POLYMER ION EXCHANGE MEMBRANES, ITS COMPOSITE MEMBRANE, AND ITS APPLICATION IN ACIDIC ELECTROLYTE FLOW BATTERY

(75) Inventors: Huamin Zhang, Dalian (CN); Xianfeng Li, Dalian (CN); Hua Dai, Dalian (CN); Cheng Bi, Dalian (CN)

(73) Assignee: DALIAN RONGKE POWER CO., LTD., Dalian, Liaoning (CN)

( * ) Notice: Subject to any disclaimer, the term of this patent is extended or adjusted under 35 U.S.C. 154(b) by 797 days.

(21) Appl. No.: 13/395,991

(22) PCT Filed: Jun. 25, 2010

(86) PCT No.: PCT/CN2010/074501
§ 371 (c)(1),
(2), (4) Date: Mar. 14, 2012

(87) PCT Pub. No.: WO2011/044778
PCT Pub. Date: Apr. 21, 2011

(65) Prior Publication Data
US 2012/0196188 A1  Aug. 2, 2012

(30) Foreign Application Priority Data
Oct. 16, 2009  (CN) .......................... 2009 1 0187902

(51) Int. Cl.
*H01M 10/0565*  (2010.01)
*H01M 8/10*  (2006.01)
(Continued)

(52) U.S. Cl.
CPC ............... *H01M 8/103* (2013.01); *C08G 73/18* (2013.01); *H01M 8/1048* (2013.01); *H01M 8/188* (2013.01); *Y02E 60/521* (2013.01); *Y02E 60/528* (2013.01)

(58) Field of Classification Search
CPC .... H01M 8/103; H01M 8/1048; H01M 8/188
USPC ......................................... 429/309, 310, 311
See application file for complete search history.

(56) References Cited

U.S. PATENT DOCUMENTS 3,708,439 A       1/1973  Sayigh et al.
2001/0028977 A1* 10/2001  Kazacos et al. ............... 429/105
(Continued)

FOREIGN PATENT DOCUMENTS

CN       1765987 A     5/2005
CN       1770503 A     5/2006
(Continued)

*Primary Examiner* — Jonathan Jelsma
*Assistant Examiner* — Rashid Alam
(74) *Attorney, Agent, or Firm* — Novick, Kim & Lee, PLLC; Allen Xue

(57) ABSTRACT

A polymer ion exchange membrane for acidic electrolyte flow battery. The membrane is nitrogen heterocycles aromatic polymer, especially polybenzimidazole type polymer. A nitrogen heterocycles in the membrane interact with acid in the electrolyte to form donor-receptor proton transport network, so as to keep the proton transport performance of the membrane. The preparation condition for the membrane is mild, and the process is simplicity. The preparation method is suitable for mass production. The membrane is used in acidic electrolyte flow battery, especially in vanadium flow energy storage battery. The membrane has excellent mechanical stability and thermostability. In vanadium redox flow battery, the membrane has excellent proton conduct performance and excellent resistance to the permeation of vanadium ions.

8 Claims, 5 Drawing Sheets

(51) Int. Cl.
*H01M 8/18* (2006.01)
*C08G 73/18* (2006.01)

(56) References Cited

U.S. PATENT DOCUMENTS

| | | | |
|---|---|---|---|
| 2002/0127474 A1 | 9/2002 | Fleischer et al. | |
| 2004/0106044 A1* | 6/2004 | Kerres | 429/314 |
| 2004/0214065 A1* | 10/2004 | Kanaoka et al. | 429/33 |
| 2007/0026293 A1* | 2/2007 | Kim et al. | 429/44 |
| 2008/0292964 A1* | 11/2008 | Kazacos | B60L 11/1879 429/231.5 |

FOREIGN PATENT DOCUMENTS

| | | |
|---|---|---|
| CN | 101148537 A | 3/2008 |
| EP | 790658 A2 | 8/1997 |
| EP | 1011158 A1 | 6/2000 |
| EP | 1798795 A1 | 6/2007 |
| JP | H10172600 A | 6/1998 |
| JP | 2008027627 A | 2/2008 |
| JP | 2009534808 A | 9/2009 |
| WO | 2005090480 A1 | 9/2005 |
| WO | 2005111103 A1 | 11/2005 |
| WO | 2007122431 A1 | 11/2007 |
| WO | 2009065892 A2 | 5/2009 |

* cited by examiner

AROMATIC POLYMER ION EXCHANGE MEMBRANES, ITS COMPOSITE MEMBRANE, AND ITS APPLICATION IN ACIDIC ELECTROLYTE FLOW BATTERY

TECHNICAL FIELD

The invention relates to membrane in an acidic electrolyte flow battery. More specifically, the invention is related to an aromatic polymer ion exchange membrane and its composite membrane and their applications in acidic electrolyte flow batteries.

BACKGROUND

Flow batteries with an acidic electrolyte is a new technology in the field of electrochemical energy storage. The advantages include high conversion efficiency, flexible system design, large storage capacity, flexibility in site selection, deep discharge, safe and environmentally friendly, and low maintenance cost, etc. It is one of the preferred technologies for the large scale and high efficiency energy storage. In particular, since the vanadium redox flow battery (VRB) has the advantages of high security, strong stability, high efficiency, long operating life (above 15 years) and low cost, etc., it has been considered as the most promising and representative among flow batteries.

The ion exchange membrane is the key component in a flow battery. It separates the positive and negative electrolytes while serves as the conduit for transporting ions between the positive and the negative electrolyte. Therefore, the ion exchange membrane is required to have a high ionic conductivity, ion selectivity and good chemical stability. After evaluating some commercial membranes, Skyllas-kazacos et al. found that with the exception that the comprehensive property of some perfluorosulfonic polymers is stable enough, other membranes (such as Selemion CMV, CMS, AMV, DMV, ASS and DSV etc.) are not stable enough in acid vanadium solution (J. Appl Electrochem, 2004, 34 (2): 137). However, studies found that even though the commercial perfluorosulfonic polymer possesses high mechanical strength and chemical stability, the permeation rate of vanadium ions when used in VRB is high. There is also obvious water migration between the anode and cathode during charge-discharge cycles. Moreover, the complex production technology, severe preparation conditions and high cost in making perfluorosulfonic polymers have severely limited the application and commercialization of VRB.

Since the aromatic polymer ion exchange membrane with nitrogen heterocycles has excellent mechanical stability, thermal stability and chemical stability, it has received widespread attention in different fields.

DETAILED DESCRIPTION OF THE CURRENT INVENTION

The present invention relates to a class of aromatic polymer ion exchange membrane and its composite membranes in the acidic electrolyte flow battery applications, particularly their applications in VRBs. This type of polymer has aromatic nitrogen heterocycles that can interact with acid and form a donor-acceptor mesh structure. The network structure can transport protons and maintain the ionic conductivity of the membrane. This type of membrane materials has excellent thermal stability, chemical stability and good ionic conductivity. It can be used in many applications, particularly suitable for use as the ion-exchange membrane in the acidic electrolyte flow battery.

The present invention discloses nitrogen heterocycles aromatic polymers that are aromatic polymers containing nitrogen heterocycles, including one or more homopolymers or copolymers of benzimidazole, vinyl imidazole, pyridine, vinyl pyridine, pyrazole, pyrimidine, thiazole, benzothiazole, oxazole, benzoxazole, oxadiazole, quinoline, quinoxaline, thiadiazole, and purine. The following are the structures of some of the polymers:

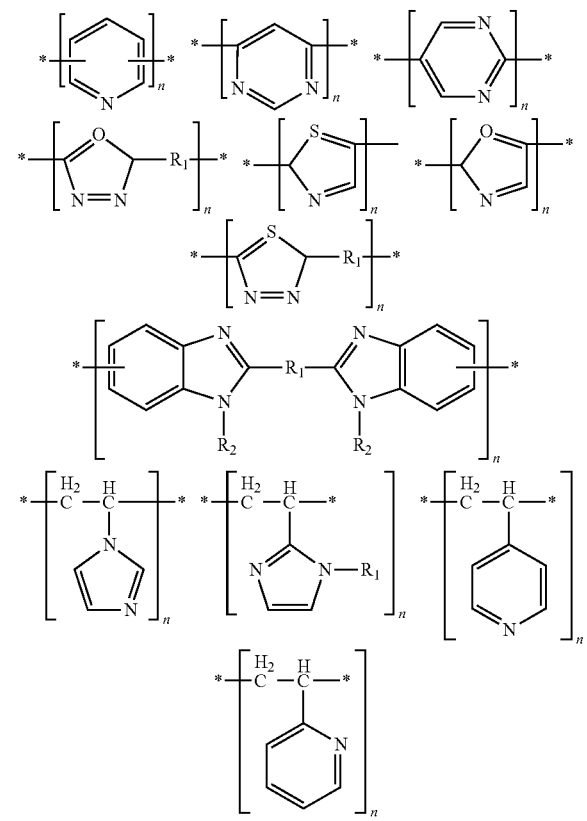

wherein n is a positive integer, $10 \leq n \leq 200$, $R_1$ is one of the following structures.

$R_2$ is chosen from hydrogen, saturated $C_1$-$C_4$ alkyl groups, or $C_2$-$C_4$ alkenyl groups.

The above-described aromatic polymers containing nitrogen heterocycles in this invention include both homopolymers and copolymers. The present invention uses polybenzimidazole (PBI) as an example and explain its structure in details.

Said homopolymer of PBI has the following structural formula:

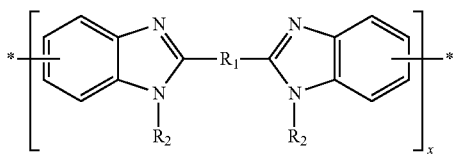

Said copolymer of PBI has the following structural formula:

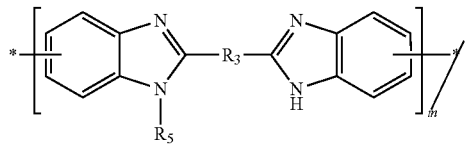

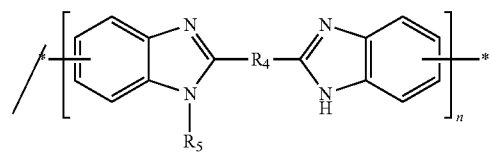

wherein x is a positive integer, $10 \leq x \leq 200$; $R_1$, $R_3$ and $R_4$ refer to one of the following structures:

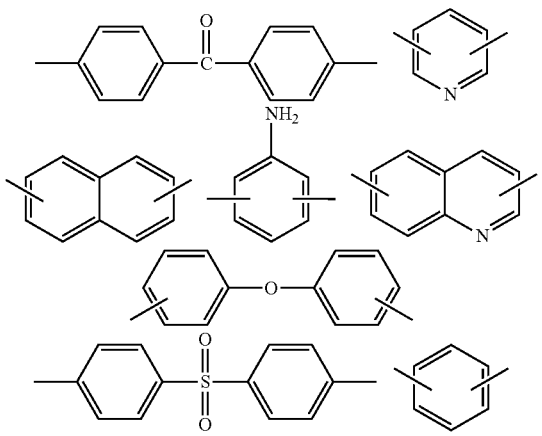

$R_2$ and $R_5$ are selected from hydrogen, $C_1$-$C_4$ alkyl groups, or $C_2$-$C_4$ alkenyl groups. wherein m and n are molar fractions of corresponding units, $0 < n \leq 0.8$, $0.2 \leq m < 1$, $m+n=1$.

Said homopolymer of PBI is poly(aryl ether benzimidazoles), whose structural formula is as follows:

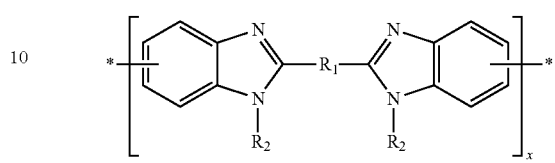

wherein $R_1$ is one of the following:

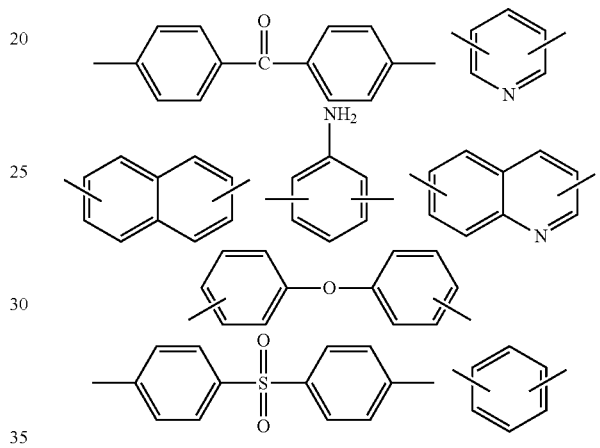

wherein $R_2$ represents one of the following:

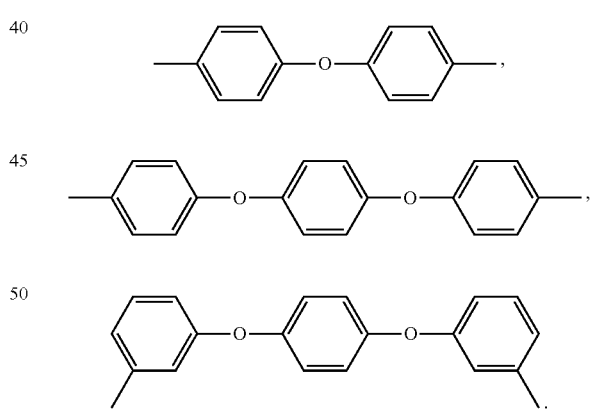

The above-described copolymer of PBI is an ion exchange membrane of PBI containing pyridine groups, whose structural formula is as follows:

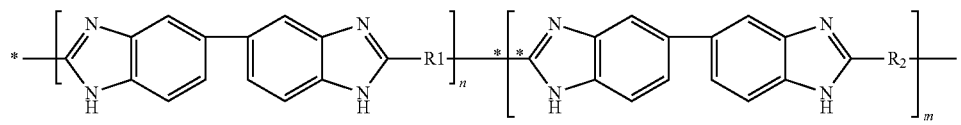

The polymer is a random copolymer, wherein x is a positive integer, 10≤x≤200; wherein m and n respectively are molar percentage of different structural units, 0<n≤0.8, 0.2≤x<1, m+n=1. The weight average molecular weight of this type of polymer is between 5,000 to 800,000. Wherein $R_1$ represents one of the followings:

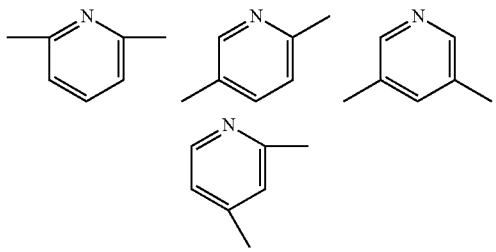

$R_2$ represents one of the followings:

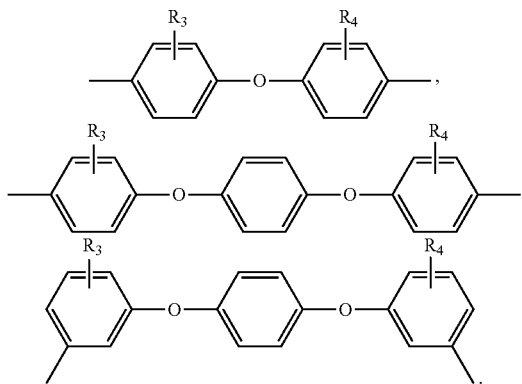

Wherein $R_3$ and $R_4$ are selected from hydrogen, $C_1$-$C_4$ alkyl groups, or $C_2$-$C_4$ alkenyl groups, $R_3$ and $R_4$ can be the same or different.

In addition, the copolymer disclosed in this invention can be random copolymers or block copolymers. Furthermore, the copolymer disclosed herein can also be copolymers of nitrogen heterocycles, such as the copolymer of poly-oxadiazole and PBI, or the copolymer of poly-triazole and PBI, etc, but not limited to the following structures:

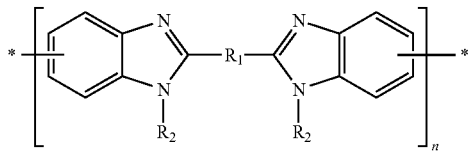

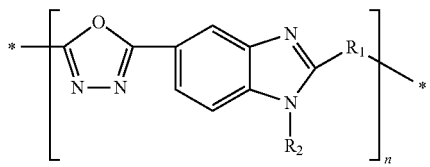

wherein n is a positive integer, 10≤n≤200, $R_1$ represents one of the followings:

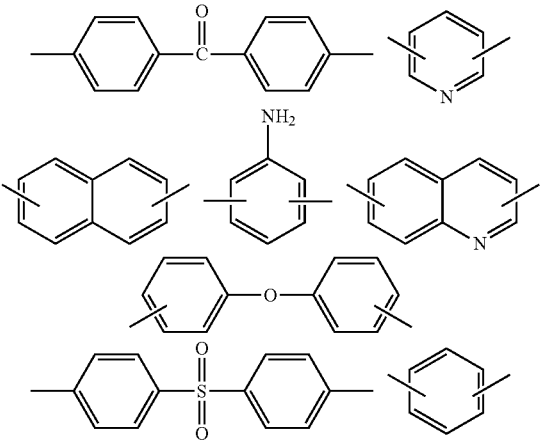

$R_2$ is selected from hydrogen, $C_1$-$C_4$ alkyl groups, or $C_2$-$C_4$ alkenyl groups.

The nitrogenous heterocyclic aromatic polymers disclosed in this invention are obtainable by nucleophilic polycondensation reaction [Progress in Polymer Science 34 (2009) 449-477].

The ion-exchange membranes are obtained using above-described polymer by solution casting. Its method of preparation can be found in the relevant patents or in the literature. Appropriate solvents are selected for various polymers according to their solubility. Dissolving the polymer to form a polymer solution then casting the solution directly on a glass plate or other flat-panel, drying and evaporation at a certain temperature to obtain an aromatic polymer ion exchange membrane. Immersing the aromatic polymer ion exchange membrane in an strong acid solution with a concentration of 0.1-25 mol/L, soaking time 0.05-1000 h, the solution temperature at 5-100° C., the thickness of aromatic polymer ion exchange membrane is 0.1 to 200 microns. After acid doping, each repeating unit in the polymer comprises one or more acid molecules.

Said organic-inorganic composite ion exchange membrane, wherein the organic phase is a PBI type polymer, whose structural formula is as follows:

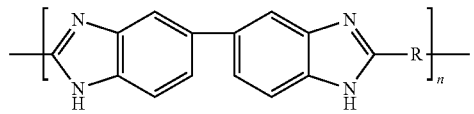

n is a positive integer, 10≤n≤200, R represents one of the followings:

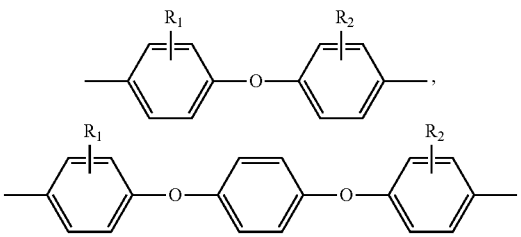

-continued

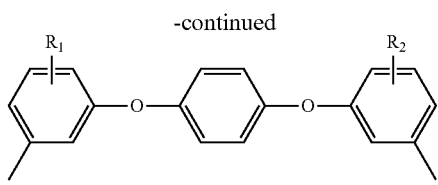

wherein $R_1$ and $R_2$ respectively are selected from hydrogen, $C_1$-$C_4$ alkyl groups, or $C_2$-$C_4$ alkenyl groups, $R_1$ and $R_2$ can be the same or different.

The organic-inorganic composite membrane is obtainable by common solution casting wherein the inorganic particles can be obtained by direct blending or by in situ sol-gel method, but not limited to these two methods.

In addition to having a polymer containing nitrogen heterocycles, the organic-inorganic composite membrane also contains another class of polymer that comprises sulfonic acid, such as one or more among perfluorinated sulfonic acid polymer, sulfonated polysulfone, sulfonated polypropylene, sulfonated poly (ether sulfone), sulfonated poly (ether sulfone), sulfonated poly aryl sulfone, sulfonated polyphenylene ether, sulfonated polyether ether ketone, sulfonated poly (aryl ether ketone). The sulfonated polymer accounts for 0.1 to 50% of the aromatic polymer, which is used in preparing organic-inorganic ion exchange membrane. Immersing the ion exchange membrane in a strong acid solution having a concentration of 0.1-25 mol/L, soaking for 0.05-1000 h, solution temperature of 5-100° C., and the thickness of the aromatic polymer ion exchange membrane is 0.1 to 200 microns. After acid doping, each repeating unit in the polymer has one or more acid molecules. The unique feature of this composite membrane is that it utilizes the interaction between the sulfonic groups and nitrogen heterocycles, effectively avoiding the permeation of ions and therefore improving the selectivity of the membrane particles.

The beneficial effects of the present invention include:

1) The present invention discloses using aromatic polymer membrane as the ion exchange membrane in the acidic electrolyte flow battery. The membrane uses acidic electrolyte as a conductive medium, acid and nitrogen heterocycles in the polymer form the structure of the receptor, and directional hopping mechanism (Grotthuss hopping mechanism) to conduct protons (see Scheme 1). It has very low water migration and very high ion selective permeability in the proton transfer process, which greatly reduces the uneven distribution of the positive and negative electrolyte and the self-discharge phenomenon, effectively extending the life of the electrolyte. The ion exchange membrane material prepared according to this invention can be easily made into membranes.

2) The ion exchange membrane prepared according to this invention has excellent thermal stability, mechanical stability and oxidation stability.

3) The membrane used in this invention has good structural stability, low cost, suitable for long and stable application in acidic electrolyte flow battery and large-scale commercial development.

4) The ion-exchange membrane prepared according to this invention has excellent ion conductivity.

5) The ion-exchange membrane prepared according to this invention has a good ion-selectivity and can avoid cross-contamination between the positive and negative electrolyte in acid flow battery.

6) The organic-inorganic composite ion-exchange membrane prepared according to this invention can effectively improve the ionic conductivity, and to maintain high ion selectivity.

7) The organic-organic composite ion-exchange membrane prepared according to this invention can effectively improve the mechanical and chemical stability of the membrane.

EMBODIMENTS

Figure 1:
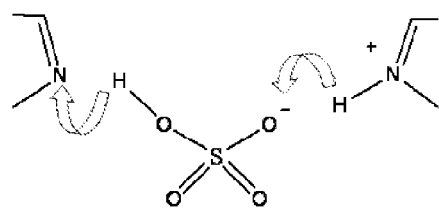
FIG. 1 is a graph illustrating the mechanism of proton transportation in aromatic polymers containing nitrogen heterocycles.

The following embodiments further illustrate this invention and do not limit scope the invention.

Comparative Example

Dupont's Nafion 115 membrane was used to assemble a VBR. Activated carbon felt was the electrode and graphite plates were used as bipolar plates. The active area of the membrane was 9 cm$^2$, the current density was 80 mA/cm$^2$. Vanadium concentration in the electrolyte was 1.50 mol/L, $H_2SO_4$ concentration was 3 mol/L. The coulombic efficiency of the flow battery was 94.8% and the voltage efficiency was 88.9%. The energy efficiency was 84.5%.

Example 1

Figure 2:
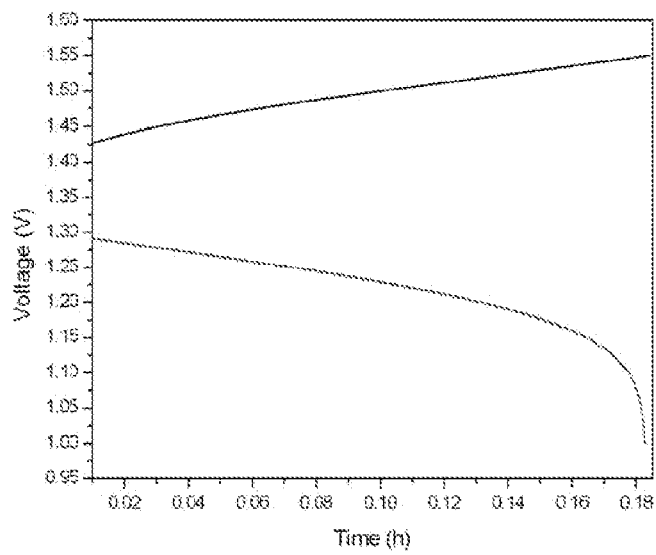
FIG. 2 is the charge-discharge performance plot of the VRB having the ion exchange membrane prepared in Example 1.

1 g PBI ($M_w$=~50,000) with the following structure was dissolved in N,N-dimethylacetamide (DMAc) to form 5 wt. % polymer solution. The solution was cast on a glass substrate and passed through a coating knife. After heated at 80° C. for 20 hours, the membrane was peeled from the glass substrate. The dried membrane was soaked in 4M $H_2SO_4$ solution for 5 hours at room temperature. The membrane was assembled in a VRB single cell with carbon felt electrodes and graphite current collectors. The concentrations of vanadium ions and $H_2SO_4$ in the electrolyte solution were 1.5 M and 3 M, respectively. The active area of the membrane was 9 cm$^2$ and the testing current density was 80 mA cm$^{-2}$. The coulombic efficiency (CE), voltage efficiency (VE) and energy efficiency (EE) were 99.34%, 82.17% and 81.6%, respectively. As shown in FIG. 2, the discharge time is close to the charge time, and the smooth discharge curve indicates that cell voltage drops slowly and continuously during discharge. Compared with commercial Nafion 115, the as-prepared PBI membrane shares similar EE and higher CE (5% higher). The result indicates that PBI membrane has very low vanadium permeation rate, which prevents the cross-mixing of different vanadium ions efficiently and improves its CE.

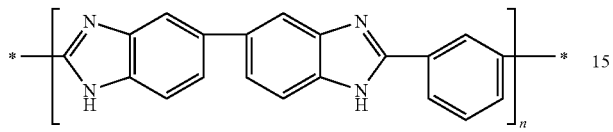

In this example, n represents the structural unit amounts of polymer, 10≤n≤200.

Example 2

3.4 g $P_2O_5$ was dissolved in 34 g phosphoric acid. The solution was poured into a 500 mL three-neck round-bottom flask and kept stirring as temperature increased. After the solution became transparent, 6 mmol 3,3',4,4'-biphenyltetramine and 6 mmol 4,4'-dicarboxydiphenyl ether (DPE) were added into the solution. The temperature of the solution was increased to 200° C. After 20 hours, the polymer solution was cooled and poured into 5 wt. % NaOH aqueous solution. In the alkali solution, the polymer was precipitated and the acid was neutralized for 24 hours. Afterward, the polymer resin was washed with deionized water to remove the residual alkali. The polymer resin was then dried and dissolved in DMSO to form 4 wt. % solution. The solution was cast on a glass substrate and passed through a coating knife. After heating at 80° C. for 20 hours, the membrane was peeled from the substrate. The dried membrane was soaked in 4M $H_2SO_4$ solution for 5 hours at room temperature. The obtained ion exchange membrane had a thickness of about 35 μM. The chemical structure of the as-prepared polymer PBI is illustrated as follow:

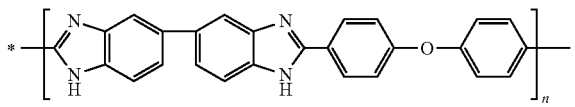

In this example, n is the degree of polymerization, 10≤n≤200.

Figure 3:
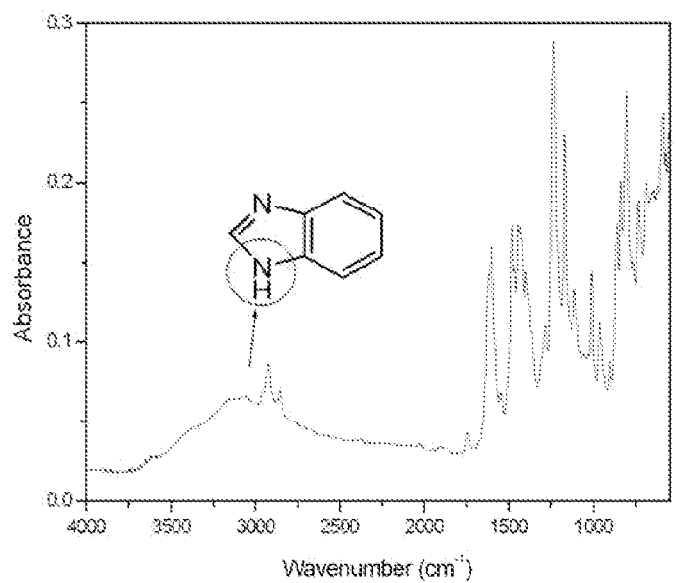
FIG. 3 is the IR spectrum of polymer prepared in Example 2.
Figure 4:
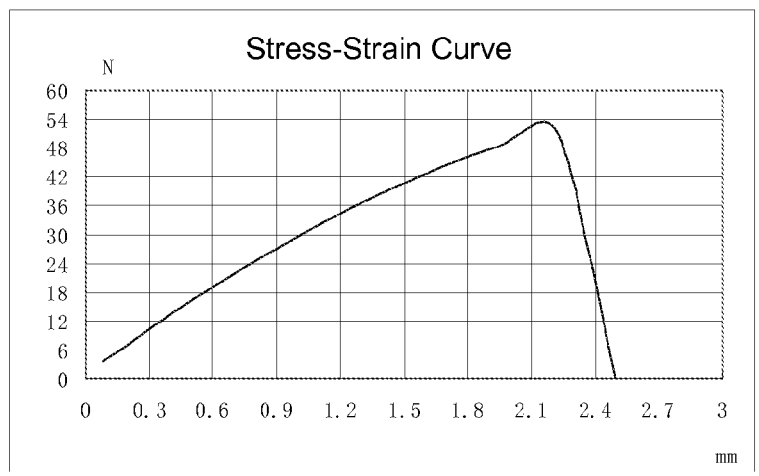
FIG. 4 is the stress-strain curve of polymer prepared in Example 2.

The IR spectrum of PBI is shown in FIG. 3, which confirms the chemical structure of the polymer. FIG. 4 represents the stress-strain curve. The yield strength and Young's modulus of the membrane are 121.9 MPa and 3.5 GPa, respectively. Compared to the polymer in Example 1, the as-prepared PBI has a higher weight average molecular weight ($M_w$=~120,000) and a high chemical stability. Due to the introduction of ether groups into the polymer, this kind of polymer is readily dissolvable and machinable.

Figure 5:
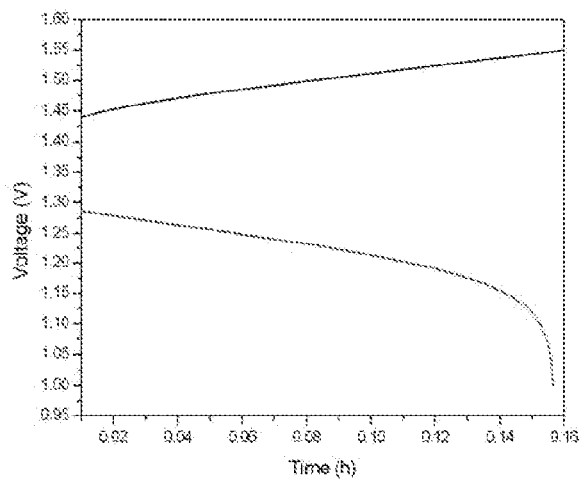
FIG. 5 is the charge-discharge performance plot of the VRB having ion exchange membrane prepared in Example 2.

The PBI membrane was assembled in a VRB single cell with carbon felt electrodes and graphite current collectors. The concentrations of vanadium ions and $H_2SO_4$ in the electrolyte solution were 1.5 M and 3 M, respectively. The active area of the membrane was 9 cm$^2$ and the testing current density was 80 mA cm$^{-2}$. The CE, VE and EE were 99.2%, 80.6% and 80.2%, respectively. As shown in FIG. 5, the discharge time is close to the charge time, and the smooth discharge curve indicates that cell voltage drops slowly and continuously during discharge, suggesting low vanadium permeation rate of the membrane.

Example 3

Same as in Example 2 except that: 1) The polymer was the following and its weight average molecular weight was about 50,000; 2) The solvent used in the polymerization reaction is methansulfonic acid; and 3) cast solution was heated at 140° C. to form the membrane.

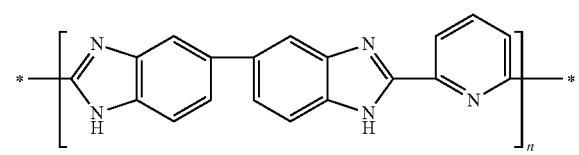

In this example, n is the degree of polymerization, 10≤n≤200.

Example 4

Same as in Example 3 except that the chemical structure of the PBI polymer was as follows, the weight average molecular weight was 70000, the polymer solution was in methansulfonic acid, and the evaporation temperature was 140° C.:

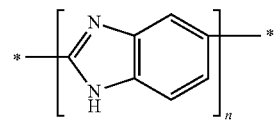

In this example, n is the degree of polymerization, 10≤n≤200.

Example 5

Same as in Example 3 except that the chemical structure of the PBI polymer was as follows, the weight average molecular weight was 40000, the polymer solution was in methansulfonic acid, and the evaporation temperature was 140° C.:

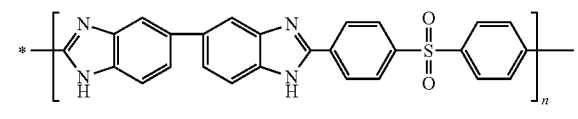

In this example, n is the degree of polymerization, 10≤n≤200.

Example 6

3.4 g $P_2O_5$ was dissolved in 34 g phosphoric acid (PPA). The solution was poured into a 500 mL three-neck round-bottom flask and kept stirring as temperature increased. After the solution became transparent, 6 mmol 3,3',4,4'-biphenyltetramine, 1.2 mmol 2,6-pyridine dicarboxylic acid and 4.8 mmol 4,4'-oxybisbenzoic acid were added into the solution. The temperature of the solution was increased to 200° C.

After 20 hours, the polymer solution was cooled and poured into 5 wt. % NaOH aqueous solution. In the alkali solution, the polymer was precipitated and the acid was neutralized for 24 hours. Afterward, the polymer resin was washed with deionized water to remove the residual alkali. The polymer resin was then dried and dissolved in DMSO to form 4 wt. % solution. The solution was cast on a glass substrate and passed through a coating knife. After heating at 80° C. for 20 hours, the membrane was peeled from the glass substrate. The dried membrane was soaked in 4M $H_2SO_4$ solution for 5 hours at room temperature. The obtained PBI ion exchange membrane contained 20 wt % pyridine and had a thickness of about 35 μm and a weight average molecular weight of about 60,000.

Figure 6:
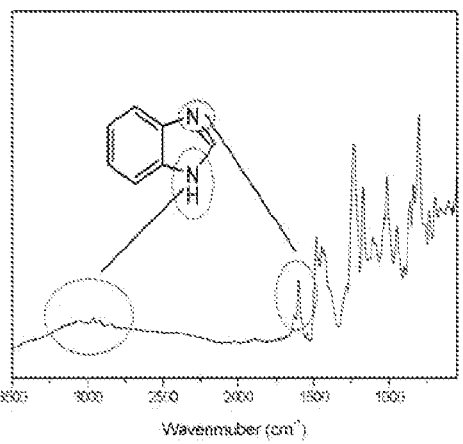
FIG. 6 is the IR spectrum of polymer prepared in Example 6.
Figure 7:
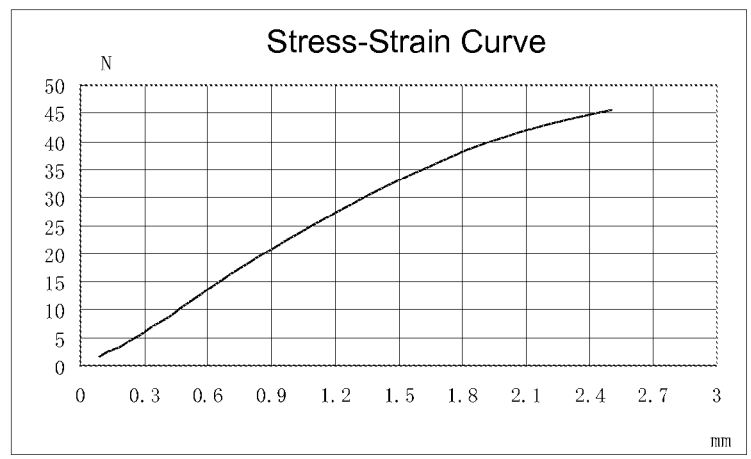
FIG. 7 is the stress-strain curve of polymer prepared in Example 6.

The IR spectrum of PBI is shown in FIG. 6, which confirms the chemical structure of the polymer. FIG. 7 represents the stress-strain curve. The yield strength and Young's modulus of the membrane are 90 MPa and 3 GPa, respectively, indicating good mechanical properties.

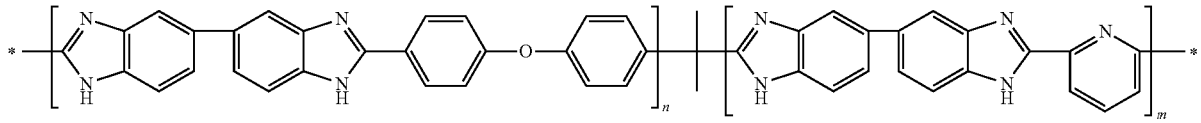

In this example, m and n are the molar ratios of corresponding chemical units (0<n≤0.8, 0.2≤m<1, m+n=1).

Figure 8:
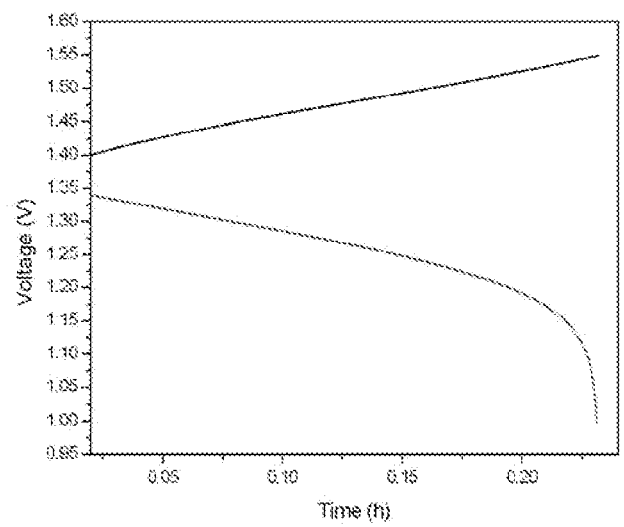
FIG. 8 is the charge-discharge performance plot of the VRB having the ion exchange membrane prepared in Example 6.

The PBI membrane was assembled in a VRB single cell with carbon felt electrodes and graphite current collectors. The concentrations of vanadium ions and $H_2SO_4$ in the electrolyte solution were 1.5 M and 3 M, respectively. The efficient area of the membrane was 9 $cm^2$ and the testing current density was 80 mA $cm^{-2}$. The CE, VE and EE were 99.3%, 86.2% and 85.6%, respectively. As shown in FIG. 8, the discharge time is close to the charge time, and the smooth discharge curve indicates that cell voltage drops slowly and continuously during discharge, suggesting low vanadium permeation rate of the membrane. Compared with Examples 1 and 2, the proton conductance of the as-prepared PBI is greatly enhanced, which is attributed to the existence of pyridine groups. As a result, VE of the VRB single cell is improved by 5% in comparison with polymer ion exchange membrane without pyridine in Example 2.

Example 7

Same as in Example 6 except that the chemical structure of the polymer was as follows:

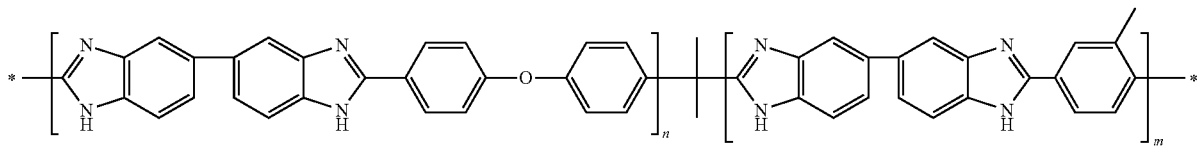

In the example, m and n are the molar ratios of corresponding chemical units (0<n≤0.8, 0.2≤m<1, m+n=1).

Example 8

Same as in Example 7 except that the polymer was a PBI copolymer having a structure as follows:

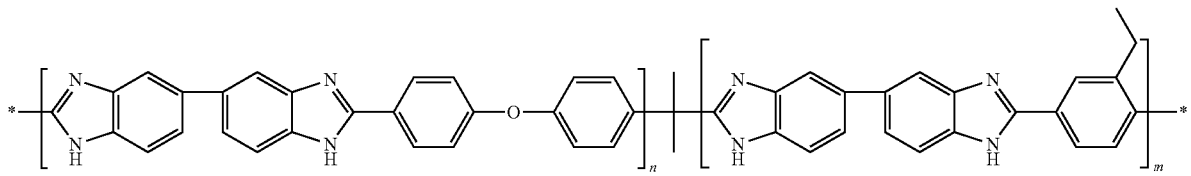

In the example, m and n are the molar ratios of corresponding chemical units (0<n≤0.8, 0.2≤m<1, m+n=1).

Example 9

Same as in Example 8 except that the polymer was a PBI copolymer having a structure as follows:

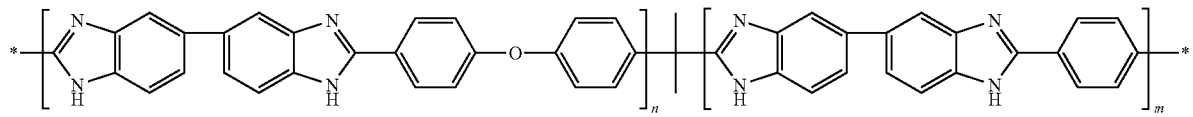

In the example, m and n are the molar ratios of corresponding chemical units (0<n≤0.8, 0.2≤m<1, m+n=1).

Example 10

Figure 9:
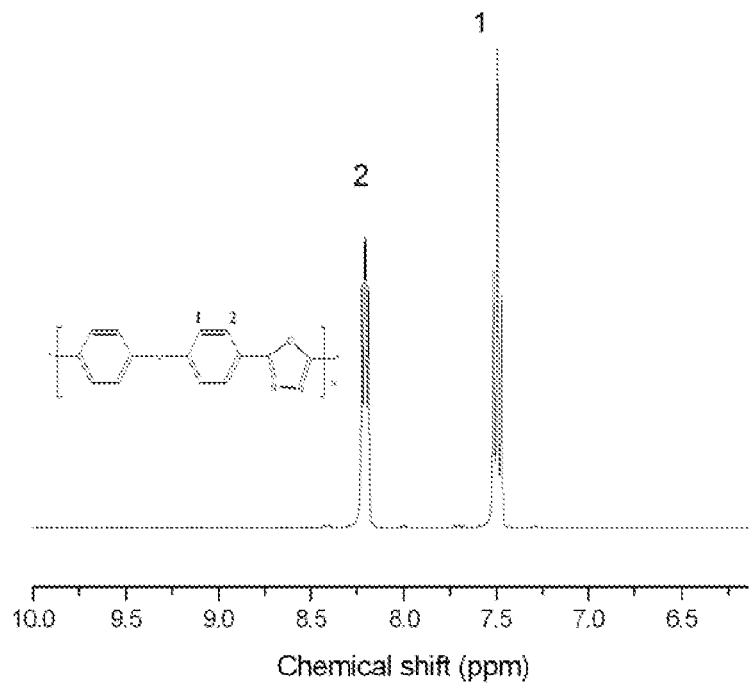
FIG. 9 is the $^1$H-NMR spectrum of polymer prepared in Example 10.
Figure 10:
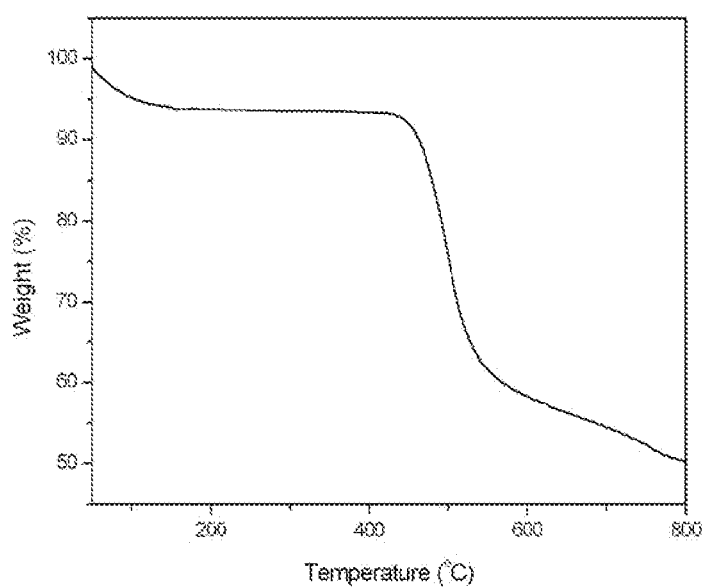
FIG. 10 is the TGA plot of polymer prepared in Example 10.

Hydrazide Sulfate (HS) was dissolved in PPA at a molar ratio of 1:10. The solution was poured into a 500 mL three-neck round-bottom flask and heated to 160° C. DPE was then added in the solution (molar ratio nHS:nDPE=1:1.2). The polymerization reaction proceeded for 4 hours. After cooling, the polymer solution was poured into 5 wt. % NaOH aqueous solution. In the alkali solution, the polymer precipitated and the acid was neutralized for 24 hours. The obtained polymer resin was washed with deionized water to remove the residual alkali. The polymer resin was filtered and dried. The average molecular weight of the polymer obtained was about 100,000. The polymer was dissolved in N-methyl-2-pyrrolidone (NMP) to form 5 wt. % solution. The solution was cast on a glass substrate and passed through a coating knife. After heated at 80° C. for 20 hours, the membrane was peeled up from the substrate. The dried membrane was soaked in 4M $H_2SO_4$ solution for 5 hours at room temperature. The ion exchange membrane of poly (4,4'-diphenylether-1,3,4-oxadiazole) (POD-DPE) thus obtained had a thickness of about 25 μm. The $^1H$ NMR spectrum of POD-DPE is shown in FIG. 9, which confirms the chemical structure of the polymer. FIG. 10 represents the TGA curve, indicating that the membrane possesses good thermal stability.

Figure 11:
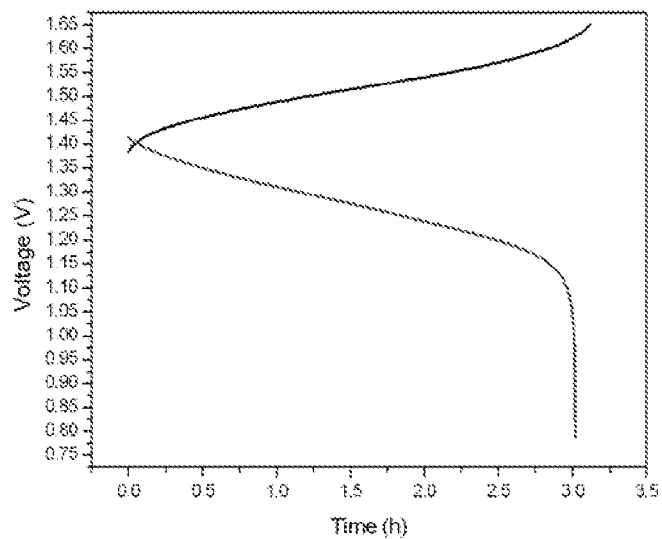
FIG. 11 is the charge-discharge performance plot of the VRB having ion exchange membrane prepared in Example 10.

The POD-DPE membrane was assembled in a VRB single cell with carbon felt electrodes and graphite current collectors. The concentrations of vanadium ions and $H_2SO_4$ in the electrolyte solution were 1.5 M and 3 M, respectively. The active area of the membrane was 6 cm$^2$ and the testing current density was 50 mA cm$^{-2}$. The CE, VE and EE were 97.9%, 83.6% and 81.9%, respectively. As shown in FIG. 11, the discharge time is close to the charge time, and the smooth discharge curve indicates that the cell voltage drops slowly and continuously during discharge, suggesting low vanadium permeation rate of the membrane. Compared to PBI, the proton conductivity of the as-prepared POD-DPE is relatively low.

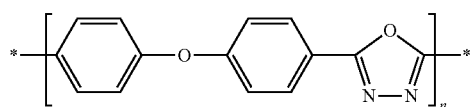

POD-DPF.

In this example, n is the degree of polymerization, 10≤n≤200.

Example 11

Same as in Example 10 except that the polymer was polyvinyl imidazole.

Example 12

Same as in Example 11 except that the polymer was the copolymer of poly-oxadizole and PBI.

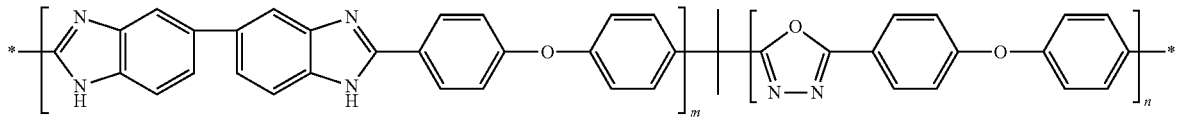

In this example, m and n are the molar ratios of corresponding chemical units (0<n≤0.8, 0.2≤m<1, m+n=1).

Example 13

0.2 g $SiO_2$ nano particles were dissolved in 20 ml DMSO and poured into a 250 ml conical flask. 1 ml Tween 80 was added in the solution, followed by stirring for 1 hour to obtain a transparent solution. 2 g PBI resin, with the structure described in Example 2, was added in the solution and kept stirring at 50-100° C. until the solution turned clear. The solution was cast on a glass substrate and passed through a coating knife. After heating at 80° C. for 20 hours, the membrane was peeled from the substrate. The dried composite membrane was soaked in 4M $H_2SO_4$ solution for 5 hours at room temperature. The obtained a composite ion exchange membrane had a thickness of about 35 μm.

Figure 12:
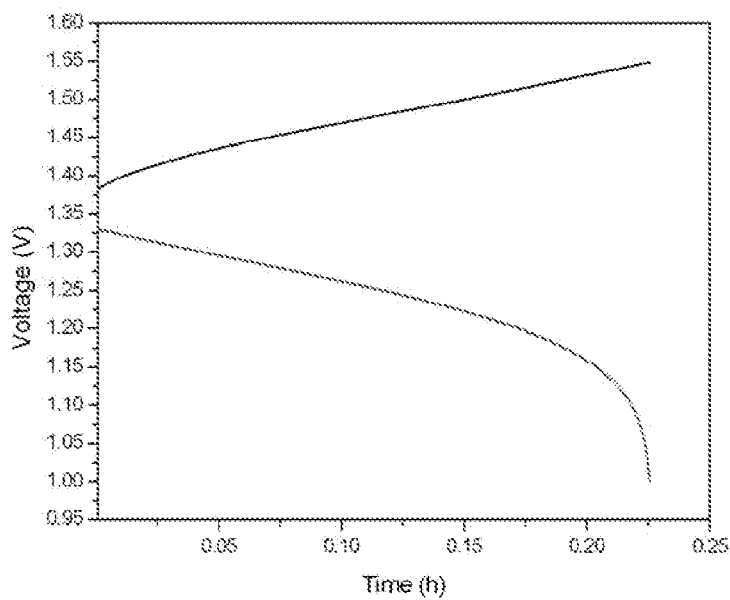
FIG. 12 is the charge-discharge performance plot of the VRB having ion exchange membrane prepared in Example 13.

The composite membrane was assembled in a VRB single cell with carbon felt electrodes and graphite current collectors. The concentrations of vanadium ions and $H_2SO_4$ in the electrolyte solution were 1.5 M and 3 M, respectively. The active area of the membrane was 9 cm$^2$ and the testing current density was 80 mA cm$^{-2}$. The CE, VE and EE were 99.3%, 83.6% and 84.2%, respectively. As shown in FIG. 12, the discharge time is close to the charge time, and the smooth discharge curve indicates that the cell voltage drops slowly and continuously during discharge, suggesting low vanadium permeation rate of the membrane. Compared to Example 2, the as-prepared composite membrane with 10 wt. % $SiO_2$ exhibits higher VE and EE. The swelling ratios of the pure PBI membrane and the composite membrane in 3M $H_2SO_4$ solution were 29.85% and 40.19%, respectively. This result suggests that the existence of $SiO_2$ effectively enhances the amount of absorbed acid in the membrane and subsequently lowers the ohmic resistance of the membrane in VRB.

Example 14

Same as in Example 13 except that the inorganic particles were TiO$_2$.

Example 15

Same as in Example 14 except that the inorganic particles were ZrO$_2$.

Example 16

PBI was dissolved in DMAc to form a 10 wt. % polymer solution, followed by blending it with Nafion® resin of Na$^+$ form. The blends solution was evaporated at 60° C. to obtain a polymer membrane. The polymer membrane was heated at 160° C. in vacuum oven for 3 hours. The heat-treated membrane was peeled off and soaked in deionized water for 100 hours to remove impurities. Then the membrane was soaked in 5M H$_2$SO$_4$ solution for 48 hours at room temperature.

Example 17

Same as in Example 16 except that the sulfonated resin used was poly(aromatic ether ketone).

Example 18

Same as in Example 17 except that the sulfonated resin was sulfonated poly(aromatic ether sulfone). Same as in Example 17 except that the sulfonated resin was sulfonated poly(phenylene oxide).

Example 19

Same as in Example 16 except that the sulfonated resin was poly(propylene).

The structural feature of the ion exchange membrane of this invention lies in the aromatic polymer with nitrogen heterocycles, especially polybenzimidazole type polymer. The nitrogen heterocycles in the structure interact with acid in the electrolyte to form donor-receptor proton transport network, so as to maintain the proton transport performance of the membrane. The preparation condition for such ion exchange membranes is mild and the process is simple. The preparation method is suitable for mass production. The invention in particular relates to the application of such membranes in acidic electrolyte flow battery, especially in VRB. The prepared membrane has excellent mechanical stability and thermostability. In VRB, the membrane has excellent proton conduction and excellent resistance to the permeation of vanadium ions.

We claim:

1. An acidic electrolyte flow battery, comprising: an ion exchange membrane comprising an aromatic polymer, wherein the aromatic polymer is a homopolymer of polybenzimidazole having a structural unit of formula I:

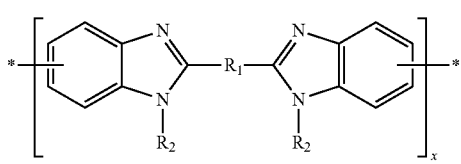

or a copolymer of polybenzimidazole having a structural unit of formula II:

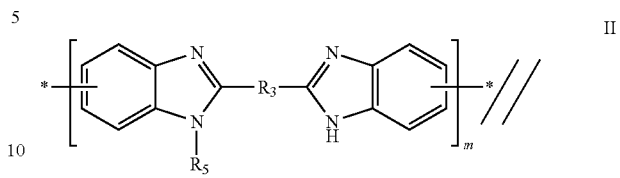

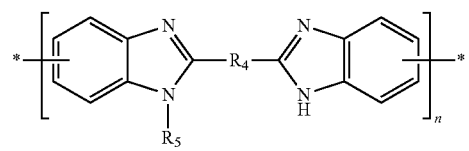

wherein R$_1$, R$_3$ and R$_4$ are

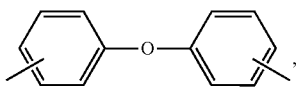

R$_2$ and R$_5$ are independently chosen from hydrogen, C$_1$-C$_4$ alkyl groups, or C$_2$-C$_4$ alkenyl groups, and wherein x is an integer ranging from 10 to 200, wherein a weight average molecular weight of the aromatic polymer ranges from 5000 to 800000, wherein m and n represent molar fractions of corresponding structural units in said copolymer, 0<n≤8, 0.2≤m<1, m+n=1.

2. The acidic electrolyte flow battery according to claim 1, wherein the aromatic polymer is a polybenzimidazole homopolymer having a structural formula as follows:

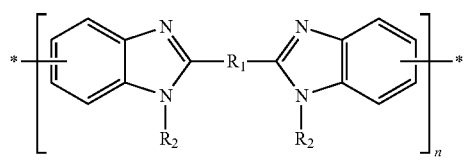

wherein R$_2$ is one of the followings

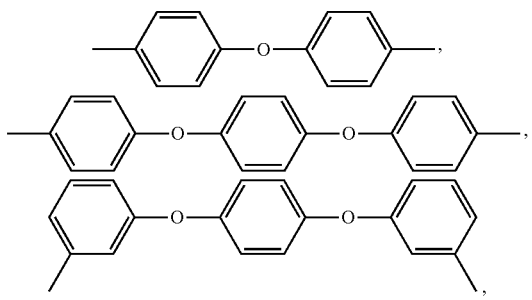

n is an integer ranging from 10 to 200, and $R_1$ is one of the followings:

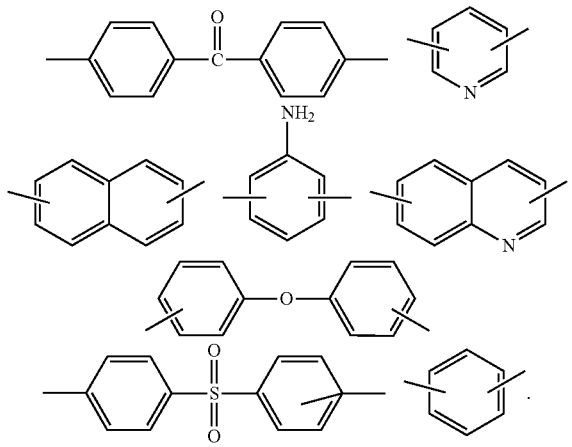

3. The acidic electrolyte flow battery according to claim 1, the polybenzimidazole copolymer comprises a pyridine functional group having structural formula as follows:

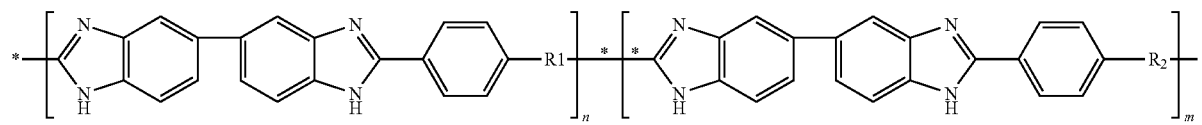

wherein said polymer is a random copolymer, m and n respectively refer to molar fractions of corresponding structural units, $0<n\leq 8$, $0.2\leq m<1$, $m+n=1$, said polymer has a weight average molecular weight ranging from 5000 to 800000, and $R_1$ is one of the followings:

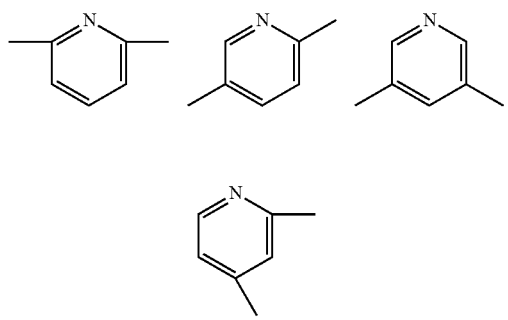

$R_2$ is one of the following structures:

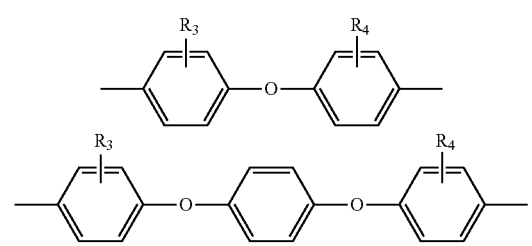

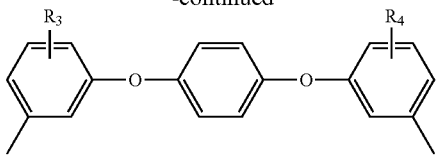

$R_3$ and $R_4$ are independently chosen from hydrogen, $C_1$-$C_4$ alkyl groups, and $C_2$-$C_4$ alkenyl groups.

4. The acidic electrolyte flow battery according to claim 1, wherein the ion exchange membrane has a thickness of 10 to 200 μm, and an acid concentration range of between 0.1-25 mol/L.

5. The acidic electrolyte flow battery according to claim 1, wherein the ion exchange membrane further comprising one or more sulfonated polymers selected from the group consisting of perfluorinated sulfonic acid polymer, sulfonated polysulfone, sulfonated polypropylene, sulfonated polyether sulfone, sulfonated poly (ether sulfone), sulfonated poly aryl sulfone, sulfonated polyphenylene ether, sulfonated polyether ether ketone, and sulfonated poly (aryl ether ketone).

6. The acidic electrolyte flow battery according to claim 1, wherein the ion exchange membrane further comprises nanoparticles of an inorganic material selected from a group consisting of $SiO_2$, $TiO_2$, $ZrO_2$, $ZrPO_3$, and mixtures thereof.

7. The acidic electrolyte flow battery according claim 6, wherein the organic-inorganic composite ion exchange membrane comprises an organic phase and an inorganic phase, a weight ratio between the inorganic phase and the organic phase is in the range of 2:100 to 30:100, wherein the organic phase is polybenzimidazole with following structure

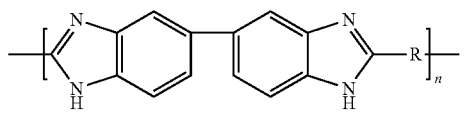

wherein n is an integer ranging from 10 to 200 and R is one of the following structures:

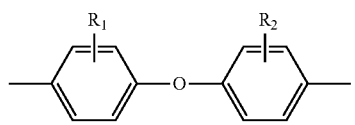

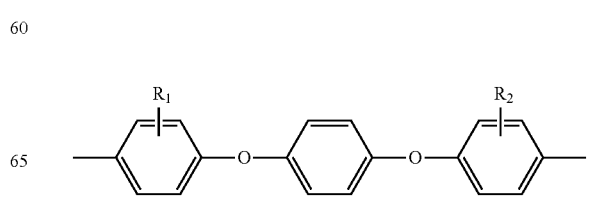

-continued
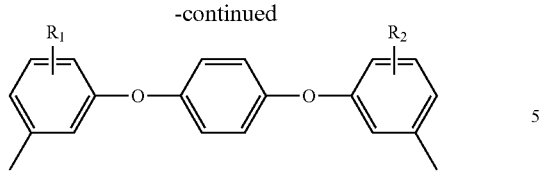
$R_1$ and $R_2$ are independently chosen from hydrogen, $C_1$-$C_4$ alkyl groups, and $C_2$-$C_4$ alkenyl groups.
8. The acidic electrolyte flow battery according to claim 6, wherein a content of the nanoparticles in the ion exchange membrane ranges from 0.1 wt % to 40 wt %.
* * * * *